(12) United States Patent
Amano et al.

(10) Patent No.: US 10,897,572 B2
(45) Date of Patent: Jan. 19, 2021

(54) IMAGING AND DISPLAY DEVICE FOR VEHICLE AND RECORDING MEDIUM THEREOF FOR SWITCHING AN ANGLE OF VIEW OF A CAPTURED IMAGE

(71) Applicant: TOYOTA JIDOSHA KABUSHIKI KAISHA, Toyota (JP)

(72) Inventors: Masaaki Amano, Nagoya (JP); Goro Asai, Toyota (JP); Tomoaki Okumura, Takatsuki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 15/700,635

(22) Filed: Sep. 11, 2017

(65) Prior Publication Data
US 2018/0115708 A1    Apr. 26, 2018

(30) Foreign Application Priority Data

Oct. 25, 2016   (JP) .................................. 2016-208407
Dec. 14, 2016   (JP) .................................. 2016-242151

(51) Int. Cl.
*H04N 5/232*     (2006.01)
*B60R 1/00*      (2006.01)
(Continued)

(52) U.S. Cl.
CPC ........... *H04N 5/23238* (2013.01); *B60R 1/00* (2013.01); *B60R 1/12* (2013.01); *B60R 99/00* (2013.01); *B60R 1/04* (2013.01); *B60R 2001/1215* (2013.01); *B60R 2001/1253* (2013.01); *B60R 2300/301* (2013.01); *B60R 2300/306* (2013.01); *B60R 2300/8066* (2013.01); *G06K 9/00791* (2013.01); *G06K 2209/23* (2013.01); *G06T 7/60* (2013.01); *G06T 7/70* (2017.01); *G06T 2207/30252* (2013.01)

(58) Field of Classification Search
None
See application file for complete search history.

(56) References Cited

U.S. PATENT DOCUMENTS 6,218,960 B1    4/2001   Ishikawa et al.
2006/0149466 A1  7/2006   Kikuchi et al.
(Continued)

FOREIGN PATENT DOCUMENTS

EP    3127764 A1    2/2017
JP    H06-032175 A  2/1994
(Continued)

*Primary Examiner* — Stuart D Bennett
(74) *Attorney, Agent, or Firm* — Oliff PLC (57) ABSTRACT

An imaging and display device for a vehicle includes: a display unit configured to display a captured image which is obtained through image capturing by an imaging unit that images a rear side of the vehicle; and a control unit configured to perform view angle switching control of switching an angle of view of the captured image displayed on the display unit to a wider angle than a current angle of view when a predetermined wide-angle condition is satisfied as a distance between an object on the rear side of the vehicle and the vehicle decreases and switching the angle of view to an original angle of view when a predetermined return condition for returning to the original angle of view is satisfied.

8 Claims, 10 Drawing Sheets

(51) Int. Cl.
*B60R 1/12* (2006.01)
*B60R 99/00* (2009.01)
*G06K 9/00* (2006.01)
*G06T 7/70* (2017.01)
*B60R 1/04* (2006.01)
*G06T 7/60* (2017.01)

(56) References Cited

U.S. PATENT DOCUMENTS

| | | | |
|---|---|---|---|
| 2009/0059006 A1* | 3/2009 | Hattori | H04N 5/232945 348/148 |
| 2009/0079585 A1 | 3/2009 | Chinomi et al. | |
| 2012/0162427 A1* | 6/2012 | Lynam | H04N 5/2251 348/148 |
| 2014/0071278 A1* | 3/2014 | Assaf | G08G 1/167 348/148 |
| 2015/0035985 A1* | 2/2015 | Conneely | B60R 1/00 348/148 |
| 2016/0003636 A1* | 1/2016 | Ng-Thow-Hing | G01C 21/3658 701/26 |
| 2017/0104938 A1* | 4/2017 | Shimosato | H04N 5/23296 |

FOREIGN PATENT DOCUMENTS

| | | |
|---|---|---|
| JP | H08-301010 A | 11/1996 |
| JP | 2000-251080 A | 9/2000 |
| JP | 2001-197482 A | 7/2001 |
| JP | 2006-264574 A | 10/2006 |
| JP | 2009-081664 A | 4/2009 |
| JP | 2010-095086 A | 4/2010 |
| JP | 2013-191050 A | 9/2013 |
| JP | 2013191050 A * | 9/2013 |
| JP | 2015-136056 A | 7/2015 |
| JP | 2016-034091 A | 3/2016 |
| KR | 2015-0110860 A | 10/2015 |
| RU | 10827 U1 | 8/1999 |
| RU | 2328702 C2 | 7/2008 |
| RU | 102827 U1 | 3/2011 |

* cited by examiner

IMAGING AND DISPLAY DEVICE FOR VEHICLE AND RECORDING MEDIUM THEREOF FOR SWITCHING AN ANGLE OF VIEW OF A CAPTURED IMAGE

INCORPORATION BY REFERENCE

The disclosure of Japanese Patent Application No. 2016-242151 filed on Dec. 14, 2016 including the specification, drawings and abstract is incorporated herein by reference in its entirety.

BACKGROUND

1. Technical Field

The disclosure relates to an imaging and display device for a vehicle that displays a captured image obtained by imaging a rear side of a vehicle and a recording medium.

2. Description of Related Art

An imaging and display device for a vehicle that is used to check a rear side of a vehicle by imaging the rear side of the vehicle using an imaging unit such as a camera and displaying a captured image obtained by the imaging on a display unit such as a monitor in a vehicle interior instead of using an optical mirror has been disclosed.

For example, in the technique described in Japanese Patent Application Publication No. 2009-81664 (JP 2009-81664 A), a rear-side image with an image size corresponding to a mirror-reflected image of an interior mirror is displayed in a relatively wide central display area which is located at the center in the horizontal direction of an image display unit. A right-rear-side image and a left-rear-side image as images compressed more than the rear-side image are displayed in outer display areas which are located outside the central display area.

SUMMARY

As described in JP 2009-81664 A, when a rear-side image is captured using a rear camera or the like disposed in a rear part of the vehicle, the camera may be disposed in a rear part of the vehicle and thus an object on the rear side of the vehicle may be displayed to be larger than an optical image appearing in an interior mirror as a distance to the object decreases. As a result, since an occupant may have a feeling of oppression due to the object displayed in a large size, there is room for improvement.

The disclosure provides an imaging and display device for a vehicle that can minimize a feeling of oppression due to a large-displayed object when a vehicle approaches an object on a rear side of the vehicle and a recording medium.

According to a first aspect of the disclosure, there is provided an imaging and display device for a vehicle, including: a display unit disposed in a front part of a vehicle interior and configured to display a captured image which is obtained through image capturing by an imaging unit that images a rear side of the vehicle; and a control unit configured to perform view angle switching control of switching an angle of view of the captured image displayed on the display unit to a wider angle than a current angle of view when a predetermined wide-angle condition is satisfied as a distance between an object on the rear side of the vehicle and the vehicle decreases and switching the angle of view to an original angle of view when a predetermined return condition for returning to the original angle of view is satisfied.

According to the aspect, a captured image which is obtained through image capturing by the imaging unit that mages the rear side of the vehicle is displayed on the display unit.

The control unit performs the view angle switching control of switching the angle of view of the captured image displayed on the display unit to a wider angle than the current angle of view when the predetermined wide-angle condition in which an occupant has a feeling of oppression due to the object displayed on the display unit is satisfied and switching the angle of view to an original angle of view when the predetermined return condition for returning the angle of view to the original angle of view is satisfied. That is, since an object is displayed to be smaller (for example, displayed with the same size as the size of an image appearing on an optical mirror) when the angle of view is switched to a wider angle than the current angle of view than when the angle of view is not switched, it is possible to minimize a feeling of oppression given to an occupant. Accordingly, it is possible to minimize a feeling of oppression due to display of an object to be larger than necessary when the vehicle approaches the object on the rear side of the vehicle.

The distance between the object on the rear side of the vehicle and the vehicle is, for example, a distance from the imaging unit to the object, a distance from a detection unit such as a distance sensor to the object, or a distance which is detected from a position of the vehicle and a position of a rear-side vehicle by acquiring position information of the rear-side vehicle through vehicle-to-vehicle communication or road-to-vehicle communication.

The predetermined wide-angle condition in which an occupant has a feeling of oppression due to the object displayed on the display unit is, for example, a condition which is defined in advance by a threshold value of a distance between an object and the vehicle, a threshold value of a size of an object in a captured image, or a threshold value of a ratio of an object in a captured image to a display area of the display unit.

Examples of the method of switching the angle of view of the captured image to a wider angle than the current angle of view include a method of switching the angle of view through image processing by changing and displaying a clipping range of the captured image and a method of driving a zoom lens or the like to optically switch the angle of view. The examples also include a method of preparing a plurality of lenses having different angles of view and an imaging unit and switching the lenses and a method of preparing a plurality of imaging units with lenses having different angles of view and switching the imaging unit.

The return condition is, for example, a condition which is defined in advance by a threshold value of a distance between an object and the vehicle, a threshold value of the size of an object in a captured image, or a threshold value of a ratio of an object in a captured image to a display area of the display unit. The return condition may employ the same threshold value as in the predetermined wide-angle condition, but may employ another threshold value in consideration of a hysteresis.

In the aspect, the control unit may receive a signal indicating rearward movement of the vehicle and switch the angle of view of the captured image to a wider angle than the current angle of view when the wide-angle condition is satisfied. Accordingly, even when a distance to a stopped rear-side vehicle decreases at the time of parking, it is possible to minimize a feeling of oppression given to an occupant.

When a distance between an object and the vehicle is small or when a size of an object displayed is relatively large, an occupant is likely to have a feeling of oppression due to the displayed rear-side object. Therefore, in the aspect, the wide-angle condition may be satisfied in at least one of a case in which a distance less than a predetermined distance is detected by a detection unit that detects a distance to an object on the rear side of the vehicle and a case in which an area of the object in the captured image is larger than a predetermined area.

In the aspect, the control unit may switch the angle of view of the captured image to a wider angle than the current angle of view when a vehicle is detected as the object and the wide-angle condition is satisfied. Accordingly, when a rear-side vehicle approaches, it is possible to minimize a feeling of oppression due to the displayed vehicle.

In the aspect, the control unit may switch the angle of view to an angle of view in a range in which a lateral width of the vehicle as the object is displayed or an angle of view in a range in which at least a part of an outline of the vehicle as the object is displayed on the display unit when switching the angle of view to a wide angle. Accordingly, it is possible to reduce a feeling of oppression due to the displayed rear-side vehicle.

In the aspect, the control unit may switch the angle of view such that the angle of view becomes a wider angle gradually as a distance to the object decreases or as the size of the object in the captured image increases when performing the view angle switching control. Accordingly, it is possible to enable natural display without displaying an object to be extremely large and without suddenly decreasing the size of an object even when a distance to the object decreases. When the angle of view is gradually switched, the angle of view may be stepwise switched or may be continuously switched.

In the aspect, the control unit may additionally perform notification control of notifying that the angle of view is being switched when the angle of view is switched to a wider angle. Accordingly, it is possible to notify an occupant that the angle of view is switched and displayed.

According to a second aspect of the disclosure, there is provided a non-transitory recording medium having a program stored therein. The program is an imaging and display program for causing a computer to function as the control unit of the imaging and display device according to the first aspect.

As described above, according to the disclosure, it is possible to minimize a feeling of oppression due to a displayed object on a rear side, which is caused when a distance between the object on the rear side of the vehicle and the vehicle decreases.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1A:
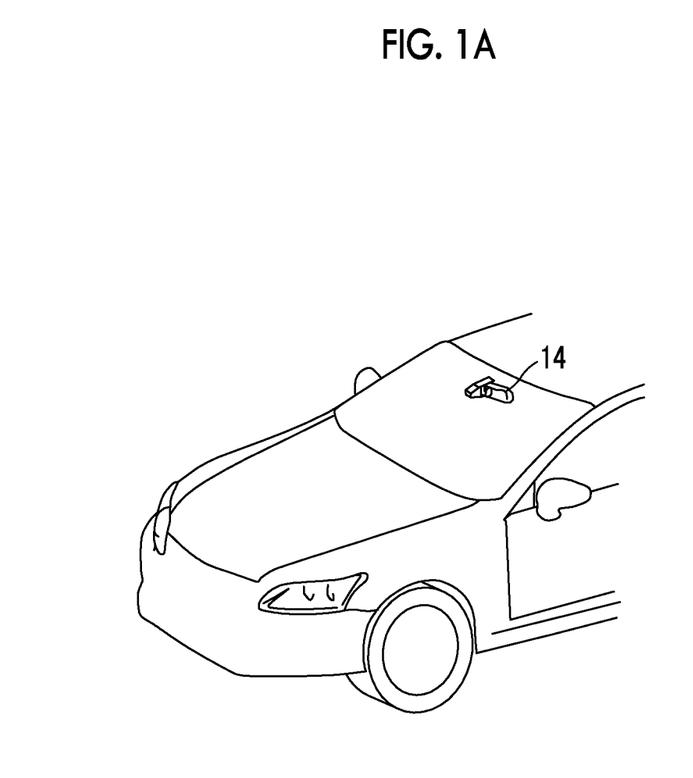
FIG. 1A is a diagram schematically illustrating a vehicle-mounting position of an imaging and display device for a vehicle according to an embodiment and illustrating a front part of the vehicle.
Figure 1B:
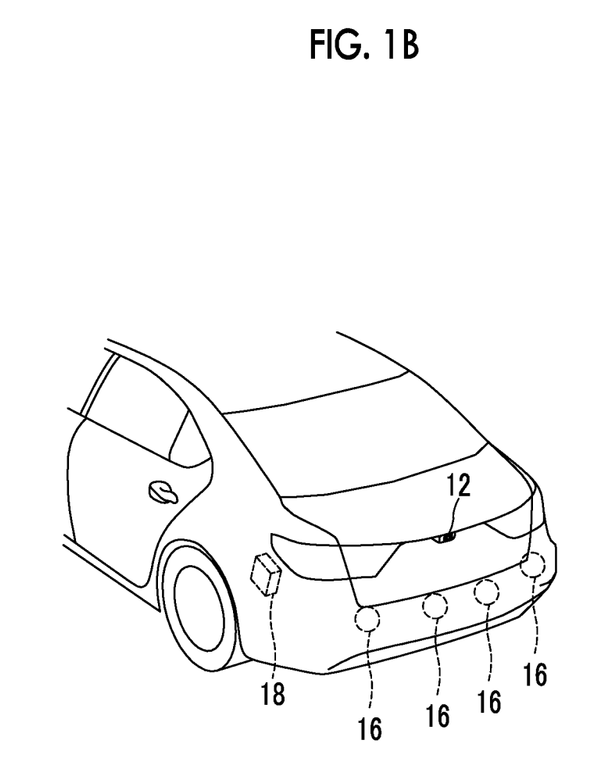
FIG. 1B is a diagram schematically illustrating a vehicle-mounting position of the imaging and display device for a vehicle according to the embodiment and illustrating a rear part of the vehicle.

Hereinafter, an example of an embodiment of the disclosure will be described in detail with reference to the accompanying drawings. FIGS. 1A and 1B are diagrams schematically illustrating a vehicle-mounting position of an imaging and display device for a vehicle according to this embodiment, where FIG. 1A illustrates a front part of the vehicle and FIG. 1B illustrates a rear part of the vehicle.

The imaging and display device for a vehicle according to this embodiment performs an image capturing operation using a camera 12 as an example of an imaging unit disposed in a rear part of the vehicle and a captured image obtained through the image capturing operation of the camera 12 is displayed on a monitor 14 as an example of a display unit disposed at a position of an interior mirror of a vehicle interior. By disposing the monitor 14 at the position of the interior mirror, it is possible to cause the monitor 14 to function as an interior mirror.

In this embodiment, a half mirror is disposed on a display surface side of the monitor 14. In a display state in which the monitor 14 is turned on, a displayed image is transmitted by the half mirror and a rear field of view can be checked using the monitor 14. On the other hand, in a non-display state in which the monitor 14 is turned off, the rear field of view can be checked using an optical reflected image of the half mirror.

A bumper in the rear part of the vehicle is provided with a distance sensor 16 as an example of a detection unit and distance information on a distance to an object on the rear side is detected. In FIG. 1B, a plurality of (four in FIG. 1B) distances sensors 16 are disposed in the bumper, but the number of distance sensors is not limited. The number of distance sensors may be one as long as a necessary area can be covered with a single distance sensor 16, or may be two or more. Since a positional relationship between the camera 12 and the distance sensor 16 is determined in advance, a distance from the camera 12 to an object can be detected by detecting a distance using the distance sensor 16.

A control device 18 that controls the camera 12 and the monitor 14 is disposed in a trunk. The control device 18 is disposed in the trunk in the above-mentioned example, but the position thereof is not limited thereto, and the control device may be disposed in another place in the vehicle interior.

Figure 2:
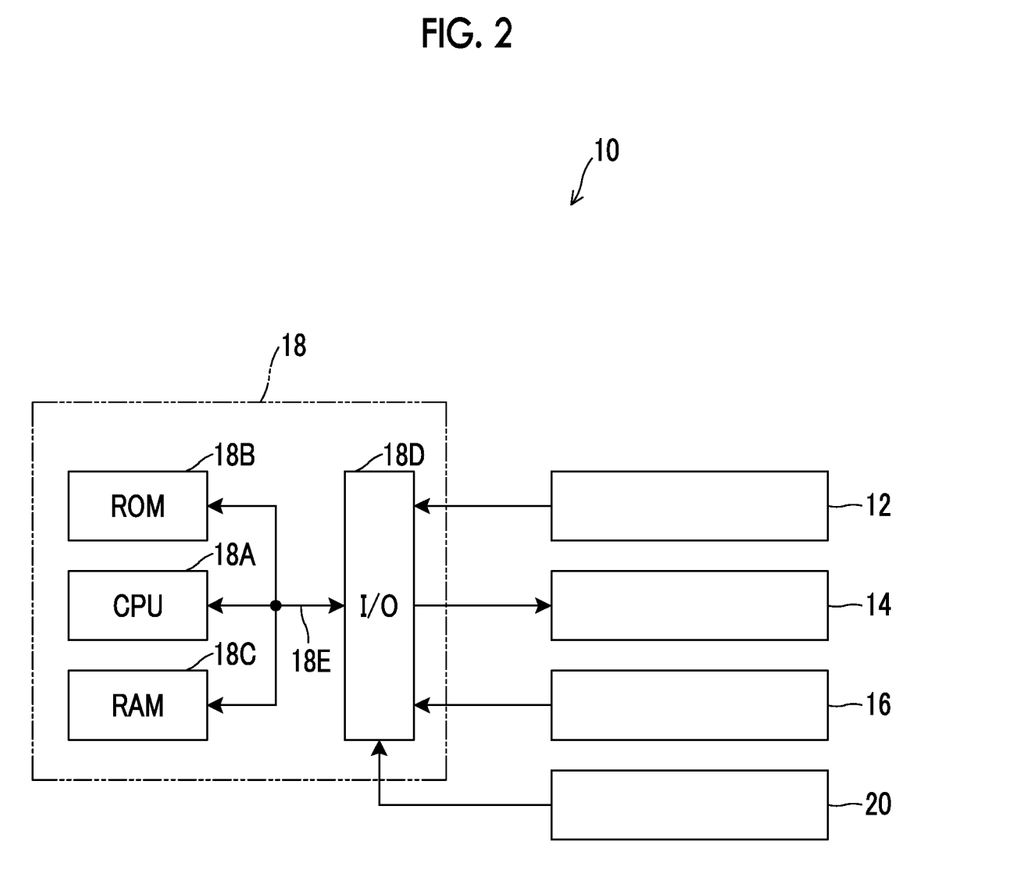
FIG. 2 is a block diagram schematically illustrating a configuration of the imaging and display device for a vehicle according to the embodiment.

FIG. 2 is a block diagram schematically illustrating a configuration of an imaging and display device for a vehicle 10 according to this embodiment.

The imaging and display device for a vehicle 10 according to this embodiment includes a camera 12, a monitor 14, a distance sensor 16, a switch 20, and a control device 18 as an example of a control unit.

The camera 12 images the rear side of the vehicle and outputs an imaging result to the control device 18. The camera 12 is, for example, disposed outside the vehicle (for example, on the trunk as illustrated in FIG. 1B) and images the rear side of the vehicle as the surroundings of the vehicle. The camera 12 is disposed outside the vehicle in this embodiment, but may be disposed in the vehicle interior.

The monitor 14 is disposed at a position at which an interior mirror is generally disposed, and is connected to the control device 18. Examples of the position at which the interior mirror is generally disposed include a position on the front side of the vehicle at the center in the vehicle width direction of the ceiling or the vicinity of an upper part at the center of a front glass windshield. In this embodiment, the monitor 14 is disposed at the position of the interior mirror, but the disclosure is not limited thereto and the monitor has only to be disposed in a front part of the vehicle interior such as an upper part of an instrument panel. A captured image which is captured by the camera 12 is displayed on the monitor 14 under the control of the control device 18.

The distance sensor 16 is a sensor that detects a distance to an object such as a rear-side vehicle and outputs distance information on the distance to an object on the rear side to the control device. The distance sensor 16 detects the distance information by outputting a signal such as ultrasonic waves or infrared rays and receiving a signal reflected from an object. A plurality of distance sensors 16 are illustrated in FIG. 1B, but one distance sensor 16 is representatively illustrated in FIG. 2.

The switch 20 is a switch for turning on/off display of the monitor 14, an operation result of the switch 20 is input to the control device 18, and the monitor 14 is turned on and off by the operation of the switch 20. The switch 20 may be disposed, for example, in a part corresponding to a lever that switches on antidazzle for the interior mirror.

The control device 18 is constituted by a microcomputer in which a CPU 18A, a ROM 18B, a RAM 18C, and an I/O (input/output interface) 18D are connected to a bus 18E.

Various programs such as a program for performing display control of displaying a captured image captured by the camera 12 on the monitor 14 are stored in the ROM 18B. By loading the program stored in the ROM 18B into the RAM 18C and causing the CPU 18A to execute the loaded program, display control of a captured image on the monitor 14 or the like is performed.

The I/O 18D is connected to the camera 12, the monitor 14, the distance sensor 16, and the switch 20. The control device 18 acquires an imaging result of the camera 12, performs processing (such as mirror image change of inverting the right and left sides of the captured image) for displaying the imaging result on the monitor 14 on the captured image, and displays the captured image on the monitor 14. In this embodiment, processing of clipping an image in an area of a predetermined reference angle of view from a captured image of the camera 12 is performed and the clipped image is displayed on the monitor 14. The predetermined reference angle of view employs a predetermined angle of view in a range in which regulations are satisfied. For example, an angle of view when the same area as an area which appears on the optical interior mirror is displayed on the monitor 14 may be employed as the predetermined reference angle of view.

In a conventional optical interior mirror, an occupant does not have a feeling of oppression even when a rear-side vehicle approaches, but in the imaging and display device for a vehicle 10 according to this embodiment, the camera 12 may be disposed in the rear part of the vehicle and a close object may appear larger than in the conventional interior mirror. Accordingly, when an object such as a rear-side vehicle approaches the rear part of the vehicle, an occupant may have a feeling of oppression.

Therefore, in the imaging and display device for a vehicle 10 according to this embodiment, view angle switching control of switching the angle of view to a wider angle of view than a current angle of view when a distance between an object on the rear side of the vehicle and the vehicle decreases and a predetermined wide-angle condition in which an occupant has a feeling of oppression due to an object displayed on the monitor 14 is satisfied and switching the angle of view to an original angle of view when a predetermined return condition for returning the angle of view to the original angle of view is satisfied is performed. Specifically, when a distance to an object on the rear side becomes less than a predetermined distance (for example, 2 m), the angle of view is switched to a wider angle than the predetermined reference angle of view (which may be hereinafter referred to as an increase in the angle of view). When the distance to the object on the rear side becomes equal to or greater than the predetermined distance, the angle of view is switched to the original reference angle of view. In this embodiment, since a partial area is clipped and displayed instead of displaying an overall captured image of the camera 12 on the monitor 14 and the angle of view is switched by changing the clipping area, display control of changing and displaying a clipping area of the captured image is performed as the view angle switching control. In the display control of switching the angle of view, specifically, an area corresponding to an angle of view to be changed to is clipped from the captured image, mirror image change or image processing of matching the number of pixels of a display area of the monitor 14 (image processing such as reduction, compression, pixel thinning, or interpolation) is performed on the clipped image, and then the resultant image is displayed. However, in the following description, for the purpose of simplification of explanation, the mirror image change, the image processing of matching the display area of the monitor 14, or the like will be skipped.

Figure 3A:
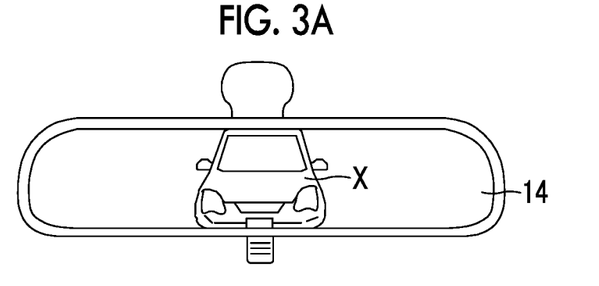
FIG. 3A is a diagram illustrating display control which is performed by the imaging and display device for a vehicle according to the embodiment.
Figure 3B:
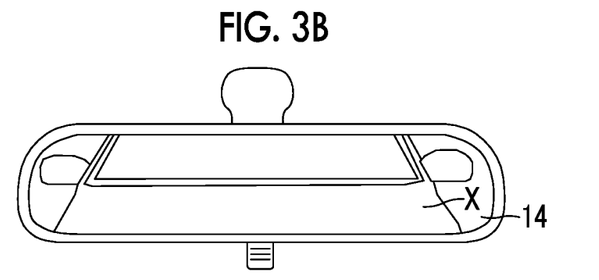
FIG. 3B is a diagram illustrating the display control which is performed by the imaging and display device for a vehicle according to the embodiment.
Figure 3C:
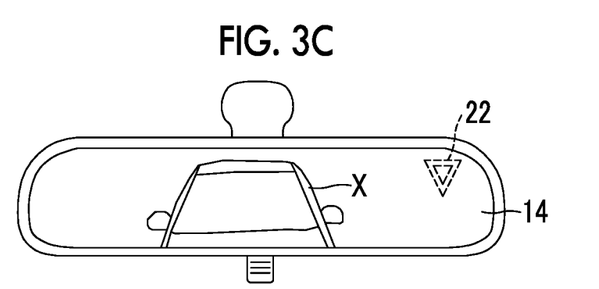
FIG. 3C is a diagram illustrating the display control which is performed by the imaging and display device for a vehicle according to the embodiment.

Specifically, as illustrated in FIG. 3A, it is assumed that a rear-side vehicle X as an object is displayed on the monitor 14. The rear-side vehicle X approaches as illustrated in FIG. 3B and is displayed to be large on the monitor 14 and thus an occupant has a feeling of oppression. Accordingly, when the distance to the rear-side vehicle X becomes less than a predetermined distance, the angle of view is switched to a wider angle. For example, the angle of view is switched to a wider angle as illustrated in FIG. 3C, and the rear-side vehicle X is displayed to be smaller on the monitor 14 than in the case in which the angle of view is not switched to a wider angle. When the distance to the rear-side vehicle X becomes equal to or greater than a predetermined distance, the angle of view is returned to the original angle of view and then the captured image is displayed on the monitor 14.

As indicated in a dotted line in FIG. 3C, a mark 22 or the like indicating that the angle of view is switched to a wider angle may be displayed and an occupant may be notified that the angle of view is switched to a wider angle. Alternatively, it may be notified that the angle of view is switched to a wider angle by performing notification control of generating sound, light, or the like.

As the method of switching the angle of view to a wider angle, a method of switching the angle of view by changing and displaying an area which is clipped from the overall captured image of the camera 12 is employed as described above in this embodiment, but a zoom lens or the like may be driven to optically switch the angle of view when a lens of the camera 12 can be driven. Alternatively, a plurality of lenses having different angles of view and a camera may be provided and the lenses may be switched between. Alternatively, a plurality of cameras including lenses having different angles of view may be prepared and the cameras may be switched between. Alternatively, the above-mentioned methods may be combined to switch the angle of view.

Figure 3D:
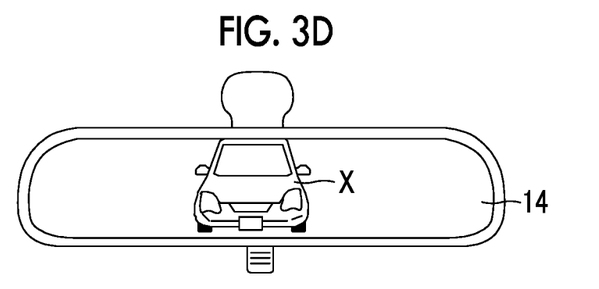
FIG. 3D is a diagram illustrating the display control which is performed by the imaging and display device for a vehicle according to the embodiment.

When the angle of view is switched to a wider angle, the angle of view may be switched to a wider angle of an area in which the lateral width of the rear-side vehicle X is displayed or a wider angle of an area in which at least a part of an outline of the rear-side vehicle X is displayed on the monitor 14 as illustrated in FIG. 3C. Alternatively, as illustrated in FIG. 3D, the angle of view may be switched to a wider angle of an area in which a road surface below the rear-side vehicle X is displayed.

Figure 4:
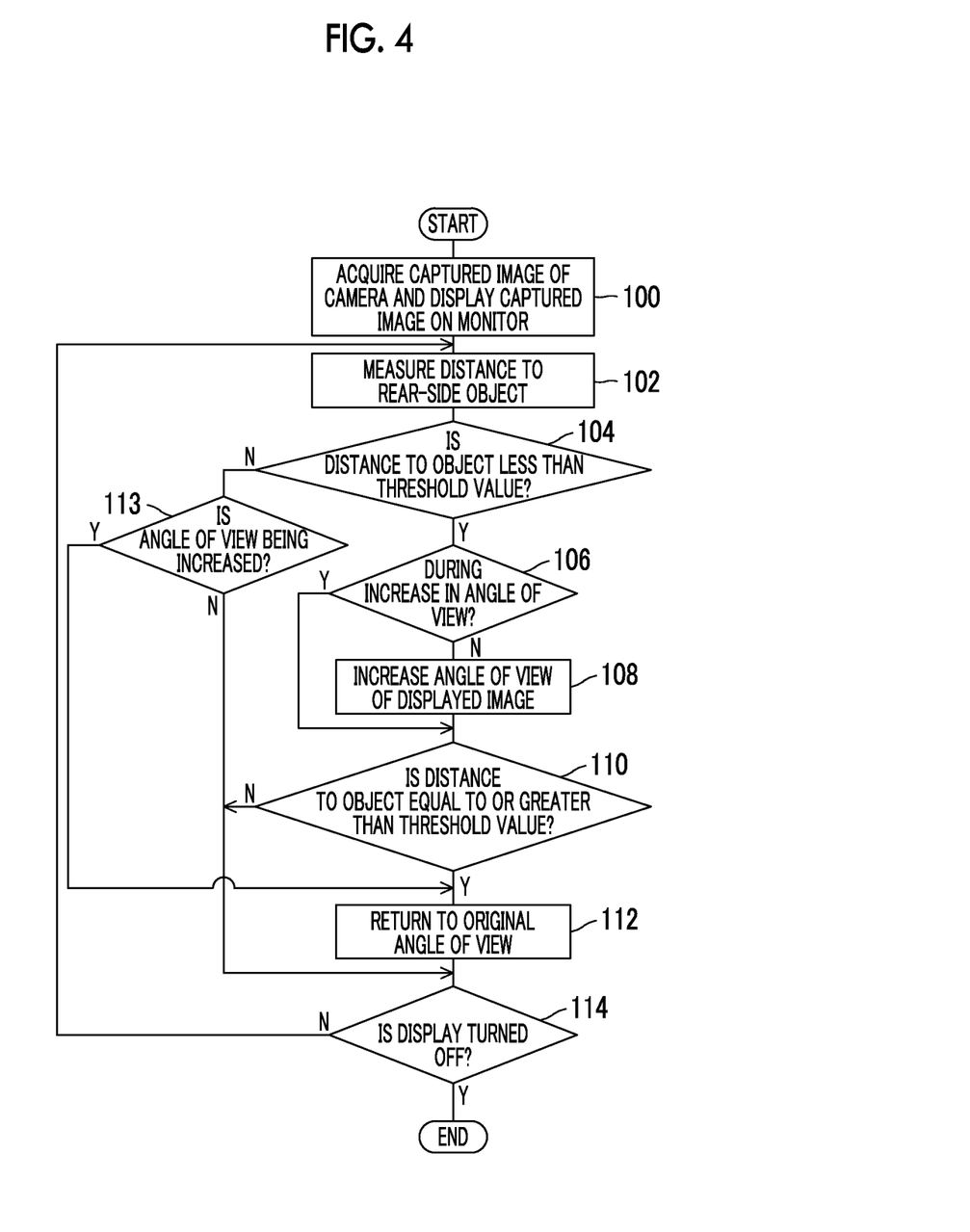
FIG. 4 is a flowchart illustrating an example of a flow of the display control which is performed by the imaging and display device for a vehicle according to the embodiment.

Subsequently, specific display control which is performed by the control device 18 of the imaging and display device for a vehicle 10 according to this embodiment having the above-mentioned configuration will be described below. FIG. 4 is a flowchart illustrating an example of a flow of the display control which is performed by the control device 18 of the imaging and display device for a vehicle 10 according to this embodiment. The flow illustrated in FIG. 4 is started when the switch 20 is turned on in a state in which an ignition switch which is not illustrated is turned on.

In Step 100, the CPU 18A acquires a captured image of the camera 12, starts displaying of the captured image on the monitor 14, and performs the process of Step 102. In this embodiment, an area corresponding to the predetermined reference angle of view from the captured image of the camera 12 is clipped and is displayed on the monitor 14. Accordingly, the captured image of the rear side of the vehicle is displayed on the monitor 14 and the rear side can be checked.

In Step 102, the CPU 18A detects a distance to an object on the rear side based on the detection result of the distance sensor 16 and then performs the process of Step 104.

In Step 104, the CPU 18A determines whether the distance to the object is less than a predetermined threshold value. The process of Step 106 is performed when the determination result is positive, and the process of Step 113 is performed when the determination result is negative.

In Step 106, the CPU 18A determines whether Step 108 to be described later has already been performed and the angle of view has been switched to a wider angle. The process of Step 108 is performed when the determination result is negative, and the process of Step 110 is performed when the determination result is positive.

In Step 108, the CPU 18A switches the angle of view of the displayed image to a wider angle and then performs the process of Step 110. Specifically, by enlarging the area which is clipped from the captured image acquired through image capturing of the camera 12, the angle of view is switched to a wider angle than that of the captured image which is currently displayed. Accordingly, when an object such as a rear-side vehicle X approaches the vehicle, the angle of view is switched to a wider angle and thus displaying of a captured image causing an occupant to have a feeling of oppression is prevented.

In Step 110, the CPU 18A detects a distance to an object again and determines whether the distance to the object is equal to or greater than a predetermined threshold value. The process of Step 112 is performed when the determination result is positive, and the process of Step 114 is performed when the determination result is negative.

In Step 112, the CPU 18A returns the angle of view to the original angle of view and then performs the process of Step 114.

On the other hand, in Step 113, the CPU 18A determines whether Step 108 has already been performed and the angle of view has been switched to a wider angle. The process of Step 112 is performed when the determination result is positive, and the process of Step 114 is performed when the determination result is negative.

In Step 114, the CPU 18A determines whether the switch 20 has been operated to instruct turning the display off. A series of processes are ended when the determination result is positive, and the above-mentioned processes are repeated from Step 102 when the determination result is negative.

Since the angle of view of a captured image is switched to a wider angle when a distance to an object on the rear side is less than a predetermined distance and the angle of view is returned to the original angle of view when the distance to the object is equal to or greater than the predetermined distance, it is possible to minimize a feeling of oppression given to an occupant without displaying a close object to look larger than in the conventional art.

The predetermined distance in the wide-angle condition for switching the angle of view to a wider angle and the predetermined distance in the return condition for returning the angle of view to the original angle of view may be set to the same distance, but it is preferable that both the predetermined distances be set to different distances to provide a hysteresis to processing in order to prevent chattering in which switching of the angle of view is repeated.

Figure 5:
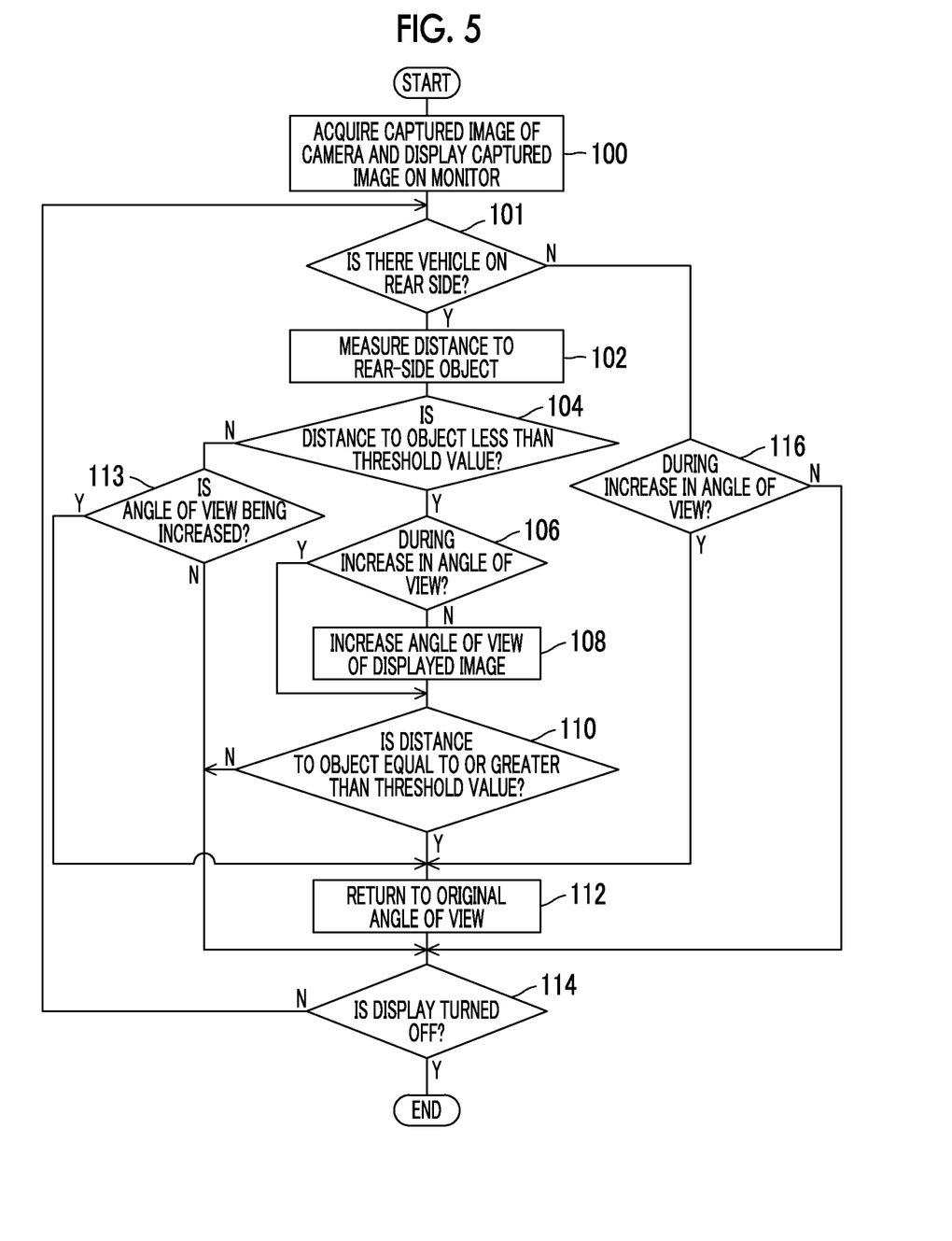
FIG. 5 is a flowchart illustrating an example of a flow of a first modified example of the display control which is performed by the imaging and display device for a vehicle according to the embodiment.

In the above-mentioned embodiment, regardless of the types of an object on the rear side, the angle of view is switched to a wider angle when the distance to an object on the rear side is less than a predetermined distance, but the object on the rear side may be limited to a vehicle. For example, as illustrated in FIG. 5, Steps 101 and 116 may be added to the flow illustrated in FIG. 4.

That is, in Step 100, the CPU 18A acquires a captured image of the camera 12, starts displaying of the captured image on the monitor 14, and performs the process of Step 101.

In Step 101, the CPU 18A determines whether there is a rear-side vehicle X. This determination is performed, for example, by detecting a rear-side vehicle X by performing image processing such as pattern matching based on the captured image of the camera 12. The process of Step 102 is performed when the determination result is positive, and the process of Step 116 is performed when the determination result is negative.

In Step 116, the CPU 18A determines whether Step 108 has been already performed and the angle of view is switched to a wider angle. The process of Step 112 is performed when the determination result is positive, and the process of Step 114 is performed when the determination result is negative.

In this way, by adding Steps 101 and 116, the angle of view can be switched when the distance to a rear-side vehicle X is less than the predetermined distance and the angle of view can be returned to the original angle of view when the distance to a rear-side vehicle X is equal to or greater than the predetermined distance. Accordingly, since the angle of view is switched to a wider angle even when a rear-side vehicle X approaches, it is possible to minimize a feeling of oppression given to an occupant without displaying the rear-side vehicle X to be large on the monitor 14.

In the above-mentioned embodiment, the angle of view is switched to a wider angle when the distance to an object on the rear side is less than a predetermined distance, but when the angle of view is rapidly switched to a wider angle, it is conceivable that the object on the rear side displayed on the monitor 14 is suddenly decreased in size due to the switching of the angle of view to give discomfort to an occupant. Therefore, when a distance to an object on the rear side is less than a predetermined distance, the angle of view may be gradually switched to a wider angle.

Figure 6A:
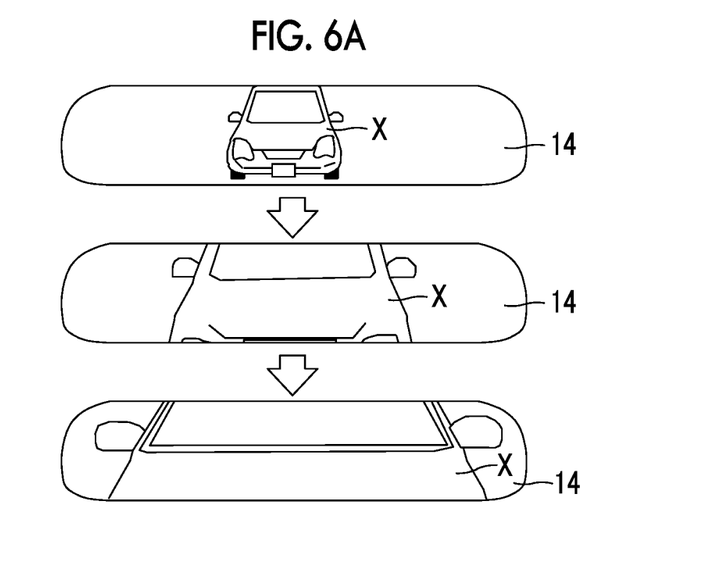
FIG. 6A is a diagram illustrating an example of an image which is displayed on a monitor when an angle of view is not switched.
Figure 6B:
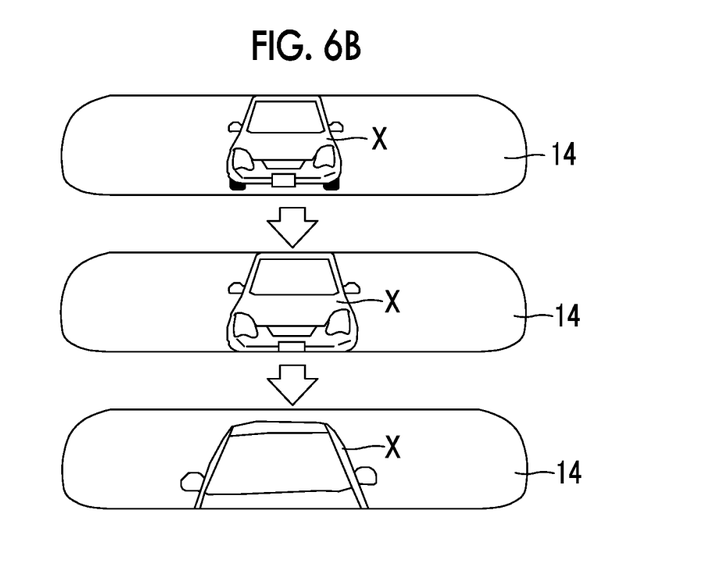
FIG. 6B is a diagram illustrating an example of an image which is displayed on the monitor when the angle of view is gradually switched to a wider angle.
Figure 7:
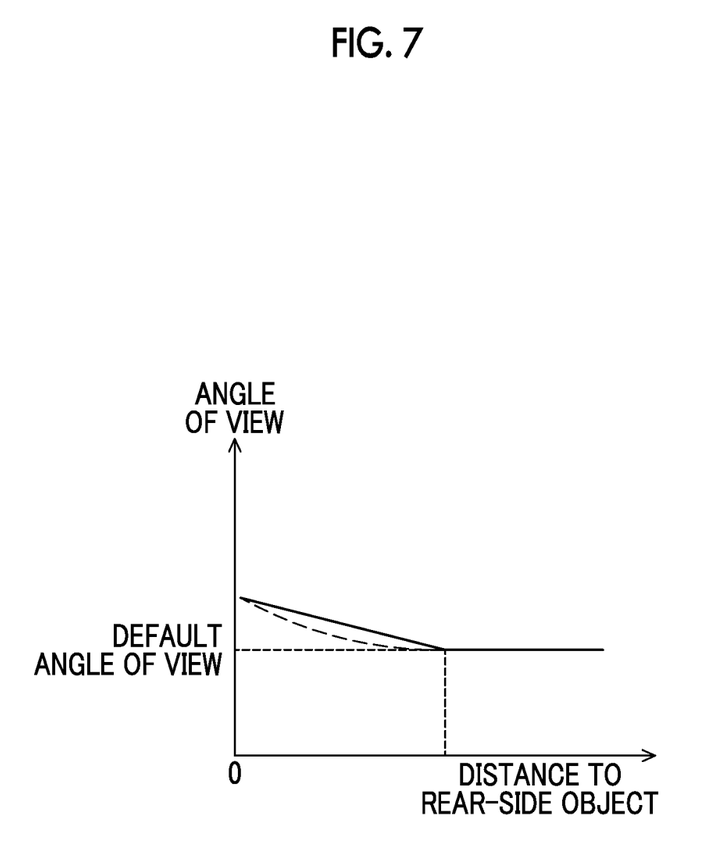
FIG. 7 is a diagram illustrating an example of dependence of an angle of view on a distance to a rear-side object.

For example, an image displayed on the monitor 14 when the angle of view is not switched is illustrated in FIG. 6A, and an image when the angle of view is gradually switched to a wider angle is illustrated in FIG. 6B. When the angle of view is not switched even when the distance to an object on the rear side (a vehicle in FIGS. 6A and 6B) decreases, the rear-side vehicle X gradually becomes closer from a state in which the overall image of the rear-side vehicle X is displayed, the rear-side vehicle X is displayed to be larger, and then only a part of the rear-side vehicle X is displayed, as illustrated in FIG. 6A. On the other hand, by gradually switching the angle of view to a wider angle, the rear-side vehicle can be naturally displayed without extremely increasing the size of the rear-side vehicle X and suddenly decreasing the size of the rear-side vehicle X even when the rear-side vehicle X approaches as illustrated in FIG. 6B. A specific method of gradually switching the angle of view to a wide angle can be embodied, for example, by determining the angle of view corresponding to the distance to an object on the rear side in advance and switching the angle of view to correspond to the distance as illustrated in FIG. 7. Here, when the angle of view is gradually switched to a wider angle as the distance to the object on the rear side decreases, the switching of the angle of view to a wider angle may be performed linearly as indicated by a solid line in FIG. 7 or may be performed nonlinearly as indicated by a dotted line in FIG. 7. When the angle of view is gradually switched to a wider angle, the switching may be performed continuously as illustrated in FIG. 7, but may be performed stepwise. Even when the angle of view is gradually switched to a wider angle, when the angle of view is switched to a wider angle, the angle of view may be switched to an angle of view in an area in which the lateral width of the rear-side vehicle X is displayed or an angle of view in an area in which at least a part of an outline of the rear-side vehicle X is displayed on the monitor 14 as described above. Alternatively, the angle of view may be switched to an angle of view in an area in which a road surface below the rear-side vehicle X is displayed.

Figure 8:
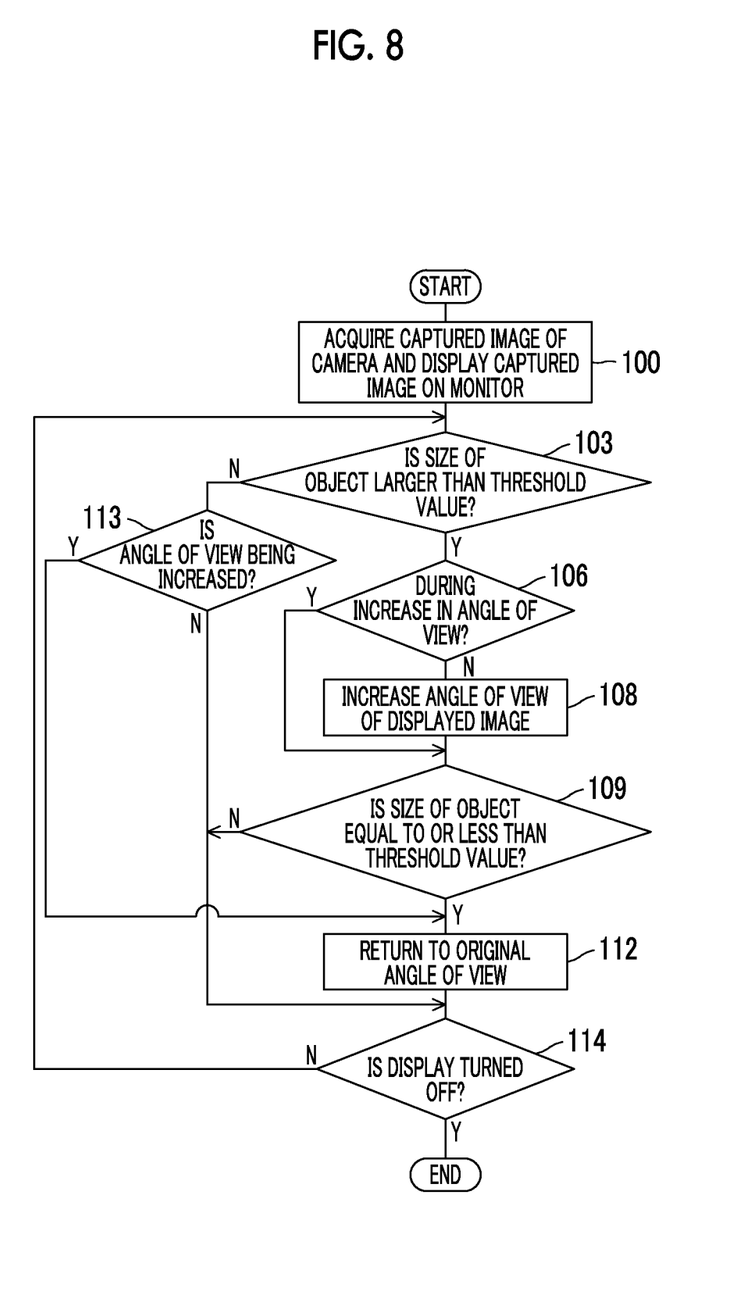
FIG. 8 is a flowchart illustrating an example of a flow of a second modified example of the display control which is performed by the imaging and display device for a vehicle according to the embodiment.

In the above-mentioned embodiment, as the predetermined wide-angle condition in which an occupant has a feeling of oppression due to an object displayed on the monitor 14, the angle of view is switched when the distance to an object on the rear side is less than a predetermined distance, but the predetermined wide-angle condition is not limited thereto. For example, the angle of view may be switched to a wider angle when a ratio at which the screen is occupied by the object displayed on the monitor 14 is equal to or greater than a predetermined ratio. Alternatively, the angle of view may be switched to a wider angle when the size of the object on the rear side in the captured image is greater than a predetermined size. In this case, for example, the area of the object in the captured image can be calculated and the angle of view can be switched to a wider angle when the calculated area is greater than a predetermined area. As specific processing, Step 103 is performed instead of Steps 102 and 104 in FIG. 4 and Step 109 is performed instead of Step 110, as illustrated in FIG. 8. That is, in Step 103, it is determined whether the size of an object in a captured image is greater than a predetermined threshold value, the process of Step 106 is performed when the determination result is positive, and the process of Step 114 is performed when the determination result is negative. In Step 109, it is determined whether the size of the object in the captured image is equal to or less than a predetermined threshold value, the process of Step 112 is performed when the determination result is positive, and the process of Step S114 is performed when the determination result is negative.

Figure 9:
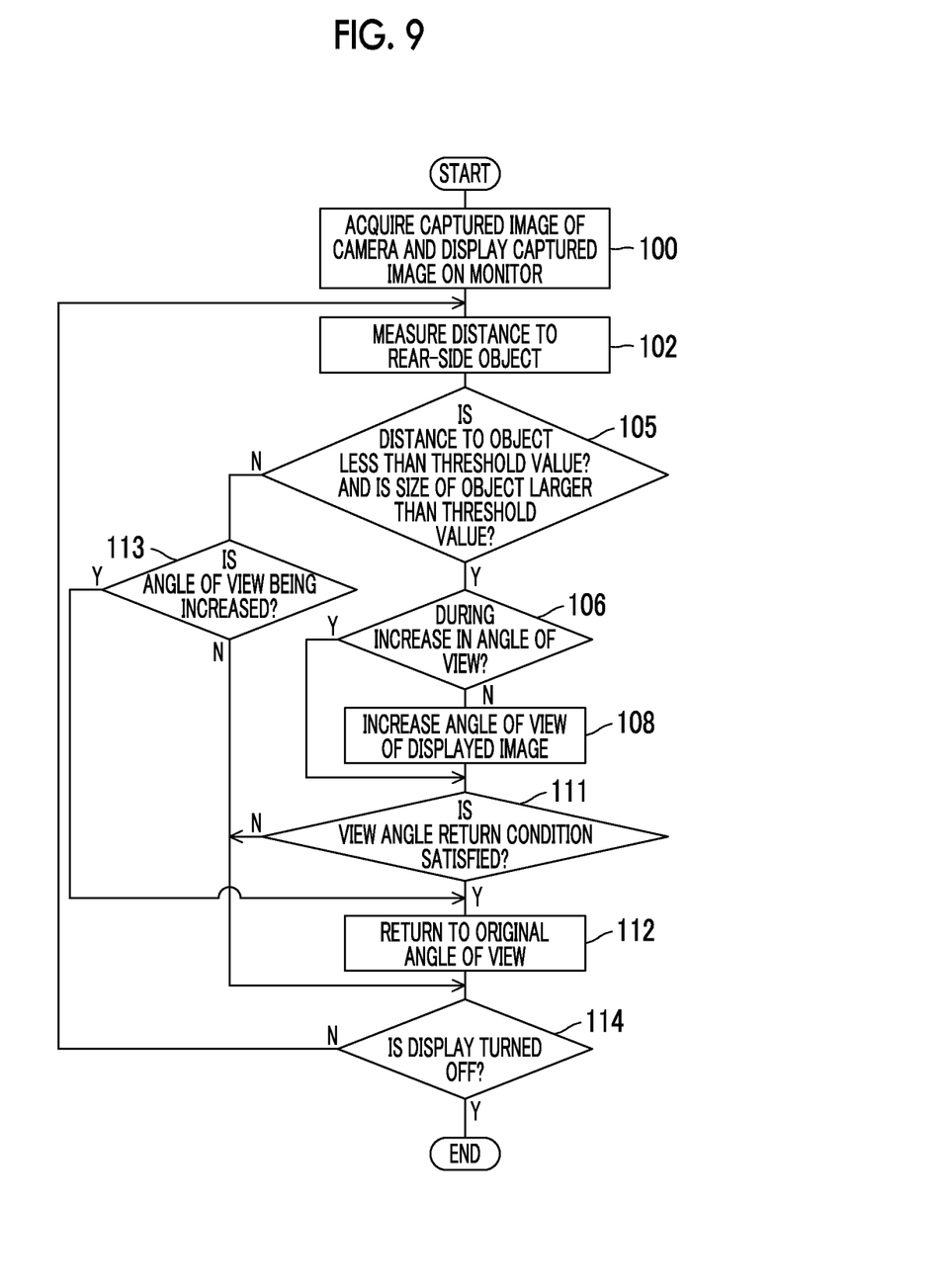
FIG. 9 is a flowchart illustrating an example of a flow of a third modified example of the display control which is performed by the imaging and display device for a vehicle according to the embodiment.

Alternatively, it is known from results of sensor tests and the like that when the display area of the monitor 14 is not full of the object at a distance less than a predetermined distance (for example, 2 m), a feeling of oppression is reduced. Accordingly, when the distance to the object is less than a predetermined distance and the size of the object on the rear side in the captured image is greater than a predetermined size, the angle of view may be switched to a wider angle. In this case, the return condition for returning the angle of view to the original angle of view may be satisfied when the distance to the object is equal to or greater than a predetermined distance or when the size of the object on the rear side in the captured image is equal to or less than a predetermined size. Alternatively, the case in which the distance to the object is equal to or greater than a predetermined distance or the case in which the size of the object on the rear side in the captured image is equal to or less than a predetermined size may be applied to the return condition. As a specific example of the processing, for example, as illustrated in FIG. 9, Step 105 is performed instead of Step 104 in FIG. 4 and Step 111 is performed instead of Step 110. That is, in Step 105, it is determined whether the distance to the object is less than a predetermined distance and whether the size of the object on the rear side in the captured image is greater than a predetermined threshold value, the process of Step 106 is performed when the determination result is positive, and the process of Step 114 is performed when the determination result is negative. In Step 111, it is determined whether the above-mentioned return condition is satisfied, the process of Step 112 is performed when the determination result is positive, and the process of Step 114 is performed when the determination result is negative.

Alternatively, when the distance to the object is less than the predetermined distance or when the size of the object on the rear side in the captured image is greater than the predetermined size, the angle of view may be switched to a wider angle.

As described above with reference to FIG. 5, Steps 101 and 116 may be added to the flows illustrated in FIGS. 8 and 9.

In the above-mentioned embodiment, regardless of a traveling direction of the vehicle, the angle of view may be switched to a wider angle when the wide-angle condition for switching the angle of view is satisfied, but the traveling direction of the vehicle when switching the angle of view may be limited to a rearward direction.

Figure 10:
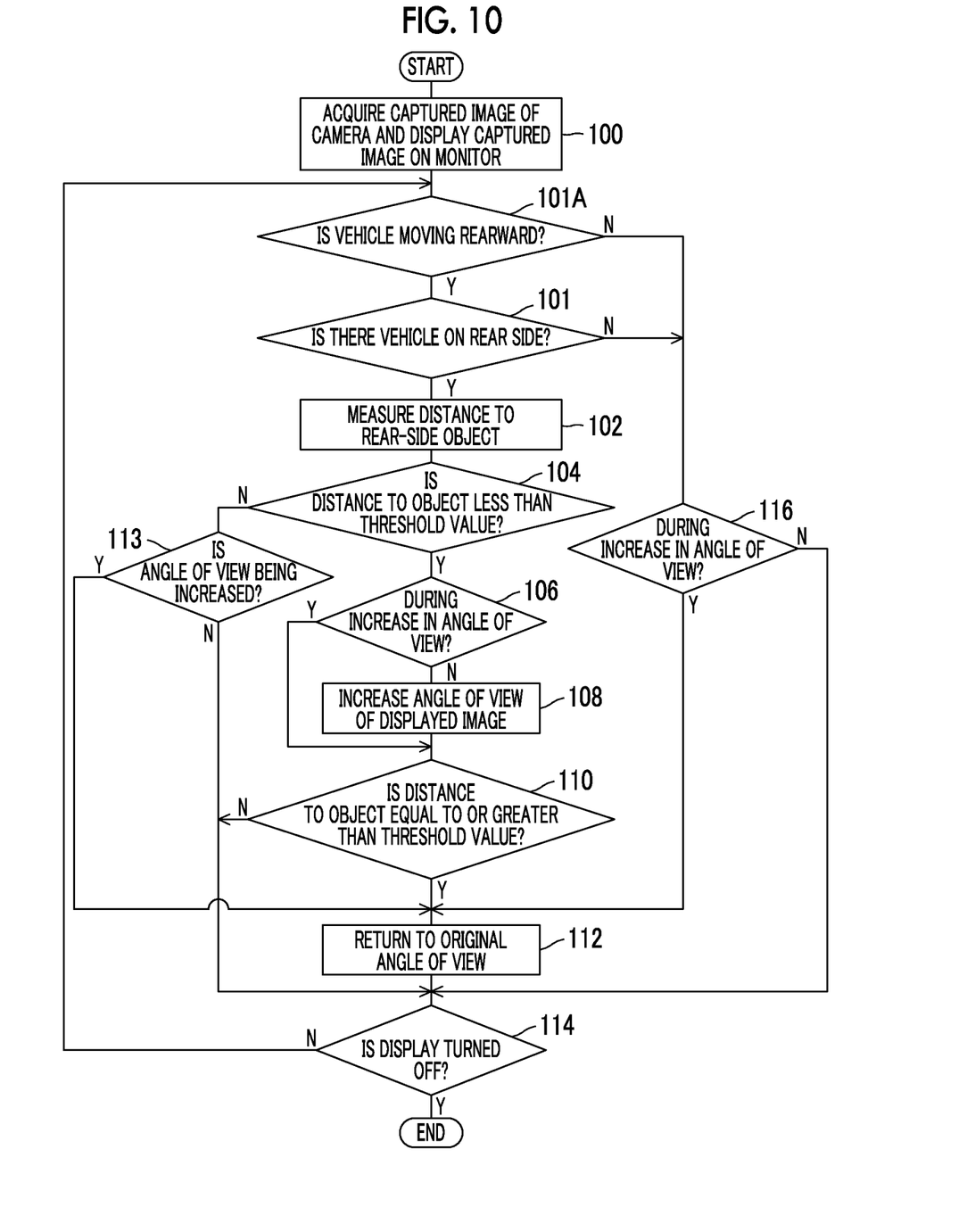
FIG. 10 is a flowchart illustrating an example of a flow of a fourth modified example of the display control which is performed by the imaging and display device for a vehicle according to the embodiment.

For example, as illustrated in FIG. 10, Step 101A may be added to the flow illustrated in FIG. 5 to be subsequent to Step 100. Alternatively, similarly to FIG. 10, Step 101A may be added to FIG. 4, 8, or 9 to be subsequent to Step 100.

That is, in the processing example illustrated in FIG. 10, the CPU 18A acquires a captured image of the camera 12 and starts displaying of the captured image on the monitor 14 in Step 100, and then performs the process of Step 101A.

In Step 101A, the CPU 18A determines whether the vehicle moves rearward. Whether the vehicle moves rearward is performed, for example, by determining whether a signal indicating rearward movement of the vehicle is received from a shift position sensor or a back switch. The process of Step 101 is performed when the determination result is positive, and the process of Step 116 is performed when the determination result is negative.

By adding Step 101A in this way, the angle of view can be switched when the distance to the rear-side vehicle X is less than the predetermined distance at the time of rearward movement and the angle of view can be returned to the original angle of view when the distance is equal to or greater than the predetermined distance. Accordingly, even when a distance to a stopped rear-side vehicle becomes less at the time of parking, it is possible to minimize a feeling of oppression given to an occupant.

In the above-mentioned embodiment, an example in which the distance to an object on the rear side is detected using the distance sensor 16 has been described, but the method of detecting the distance to an object is not limited to the distance sensor 16. For example, position information of a rear-side vehicle X may be acquired by vehicle-to-vehicle communication or road-to-vehicle communication and the distance to the rear-side vehicle may be detected. Alternatively, the distance to an object may be detected from a captured image of a monocular camera using image processing such as a projection difference or an optical flow. Alternatively, the distance to an object on the rear side may be detected from a captured image obtained using a stereoscopic camera.

The display control illustrated in FIGS. 4, 5, 8, and 9 which is displayed by the control device 18 of the imaging and display device for a vehicle 10 according to the above-mentioned embodiment has been described to be software processing which is performed by executing a program, but may be performed by hardware. Alternatively, the display control may be performed in combination of software and hardware. The program stored in the ROM may be recorded on various recording mediums and may be distributed.

The disclosure is not limited to the above description, but can be modified in various forms without departing from the gist of the disclosure.

What is claimed is:

1. An imaging and display device for a vehicle, comprising:
    a display disposed in a front part of a vehicle interior and configured to display a captured image which is obtained through image capturing by a camera that images a rear side of the vehicle; and
    a processor programmed to:
        switch an angle of view of the captured image displayed on the display to a wider angle than a current angle of view when a predetermined wide-angle threshold is satisfied as a distance between an object on the rear side of the vehicle and the vehicle decreases; and
        switch the angle of view to an original angle of view when a predetermined return threshold for returning to the original angle of view is satisfied, wherein
    the angle of view of the captured image is switched by changing and displaying a partial area of an image that is clipped from the captured image,
    the predetermined wide-angle threshold and the predetermined return threshold are defined by threshold values, and
    a threshold value defined for the predetermined wide-angle threshold is a ratio of an object in the captured image to a display area of the display, and a threshold value defined for the predetermined return threshold is a ratio of an object in the captured image to a display area of the display.

2. The imaging and display device according to claim 1, wherein the processor is further programmed to receive a signal indicating rearward movement of the vehicle and switch the angle of view of the captured image to a wider angle than the current angle of view when the wide-angle threshold is satisfied.

3. The imaging and display device according to claim 1, wherein the wide-angle threshold is satisfied in at least one of a case in which a distance less than a predetermined distance is detected by a sensor that detects a distance to an object on the rear side of the vehicle and a case in which an area of the object in the captured image is larger than a predetermined area.

4. The imaging and display device according to claim 1, wherein the processor is further programmed to switch the angle of view of the captured image to a wider angle than the current angle of view when another vehicle is detected as the object and the wide-angle threshold is satisfied.

5. The imaging and display device according to claim 4, wherein the processor is further programmed to switch the angle of view to an angle of view in a range in which a lateral width of the vehicle as the object is displayed or an angle of view in a range in which at least a part of an outline of the vehicle as the object is displayed on the display when switching the angle of view to a wide angle.

6. The imaging and display device according to claim 1, wherein the processor is further programmed to switch the angle of view such that the angle of view becomes a wider angle gradually as a distance to the object decreases or as the size of the object in the captured image increases when performing the view angle switching control.

7. The imaging and display device according to claim 1, wherein the processor is further programmed to additionally perform notification control of notifying that the angle of view is being switched when the angle of view is switched to a wider angle.

8. A non-transitory recording medium having a program stored, wherein the program is an imaging and display program that causes a computer to execute:
- switching an angle of view of a captured image displayed on a display to a wider angle than a current angle of view when a predetermined wide-angle threshold is satisfied as a distance between an object on a rear side of the vehicle and the vehicle decreases, the display being disposed in a front part of a vehicle interior and being configured to display the captured image, which is obtained through image capturing by a camera that images a rear side of the vehicle, and
- switching the angle of view to an original angle of view when a predetermined return threshold for returning to the original angle of view is satisfied, wherein
- the angle of view of the captured image is switched by changing and displaying a partial area of an image that is clipped from the captured image,
- the predetermined wide-angle threshold and the predetermined return threshold are defined by threshold values, and
- a threshold value defined for the predetermined wide-angle threshold is a ratio of an object in the captured image to a display area of the display, and a threshold value defined for the predetermined return threshold is a ratio of an object in the captured image to a display area of the display.

* * * * *